US009151615B2

(12) United States Patent  (10) Patent No.: US 9,151,615 B2
Hansen  (45) Date of Patent: Oct. 6, 2015

(54) NAVIGATION SYSTEM AND METHOD FOR NAVIGATION

(71) Applicant: Harman Becker Automotive Systems GmbH, Karlsbad (DE)

(72) Inventor: Lars Hansen, Munich (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 50 days.

(21) Appl. No.: 13/952,209

(22) Filed: Jul. 26, 2013

(65) Prior Publication Data

US 2014/0032112 A1    Jan. 30, 2014

(30) Foreign Application Priority Data

Jul. 27, 2012   (EP) .................................... 12005513

(51) Int. Cl.

| | | |
|---|---|---|
| *G08G 1/123* | (2006.01) | |
| *G01C 21/00* | (2006.01) | |
| *G01C 21/26* | (2006.01) | |
| *G01C 21/36* | (2006.01) | |
| *B60R 1/06* | (2006.01) | |
| *B60R 1/12* | (2006.01) | |

(52) U.S. Cl.
CPC . *G01C 21/00* (2013.01); *B60R 1/06* (2013.01); *B60R 1/12* (2013.01); *G01C 21/265* (2013.01); *G01C 21/3688* (2013.01); *B60R 2001/1284* (2013.01)

(58) Field of Classification Search
CPC ................ A63F 2300/1075; A63F 2300/1087; A63F 2009/2435; A63F 2009/2457; G08G 1/16; G08G 1/163; G08G 1/168; G08G 1/166; B60R 2300/303; B60R 2300/605; B60R 2300/806; B60R 11/0235; B60R 11/04; B60R 1/06; B60R 2001/121
USPC ........................... 701/400–541; 340/988–996
See application file for complete search history.

(56) References Cited

U.S. PATENT DOCUMENTS

| | | | |
|---|---|---|---|
| 6,111,684 A | 8/2000 | Forgette et al. | |
| 6,545,598 B1 | 4/2003 | de Villeroche | |
| 2005/0187710 A1 | 8/2005 | Walker | |
| 2005/0273263 A1* | 12/2005 | Egami et al. .................. | 701/301 |
| 2007/0162229 A1 | 7/2007 | McCarthy et al. | |
| 2010/0060650 A1* | 3/2010 | Yamakami .................... | 345/474 |
| 2010/0194596 A1* | 8/2010 | Wang et al. ................... | 340/936 |
| 2010/0245701 A1 | 9/2010 | Sato et al. | |

FOREIGN PATENT DOCUMENTS

| | | | |
|---|---|---|---|
| CN | 1346223 | * | 4/2002 |
| DE | 102010007766 | | 9/2010 |
| EP | 1736360 | | 12/2006 |

(Continued)

*Primary Examiner* — Muhammad Shafi
(74) *Attorney, Agent, or Firm* — O'Shea Getz P.C.

(57) ABSTRACT

A navigation system of a vehicle includes a first display arranged behind a first mirror surface of a right outside mirror of the vehicle, a second display arranged behind a second mirror surface of a left outside mirror of the vehicle, and a control unit connected to the first display and the second display to control an output of graphic information on the first display and the second display. The control unit is configured to determine a current maneuver instruction based on a route and a current position of the vehicle, and the control unit is configured to control the output of different graphic information on the first display and the second display, based on the current maneuver instruction and/or the current position.

15 Claims, 4 Drawing Sheets

(56) References Cited

FOREIGN PATENT DOCUMENTS

| | | |
|---|---|---|
| EP | 2068121 | 6/2009 |
| FR | 2876205 | 4/2006 |
| JP | 0523033 | 3/1993 |
| JP | 2000221048 | 8/2000 |
| JP | 2001108476 | 4/2001 |
| JP | 2008018798 | 1/2008 |
| JP | 2008129840 | 6/2008 |
| JP | 2010089705 | 4/2010 |
| JP | 2011113579 | 6/2011 |

* cited by examiner

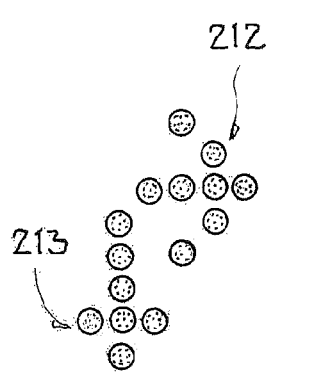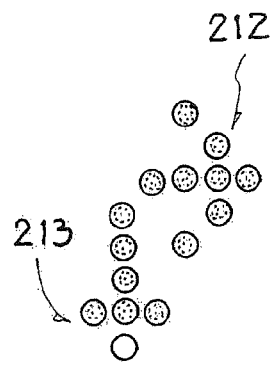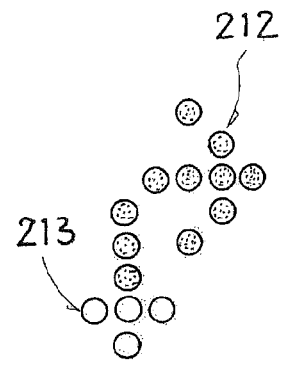
FIG. 3a  FIG. 3b  FIG. 3c
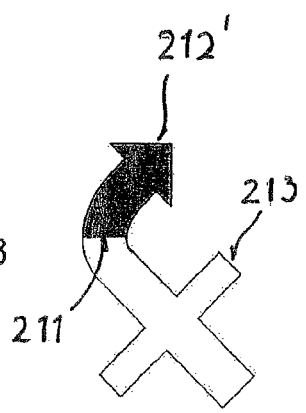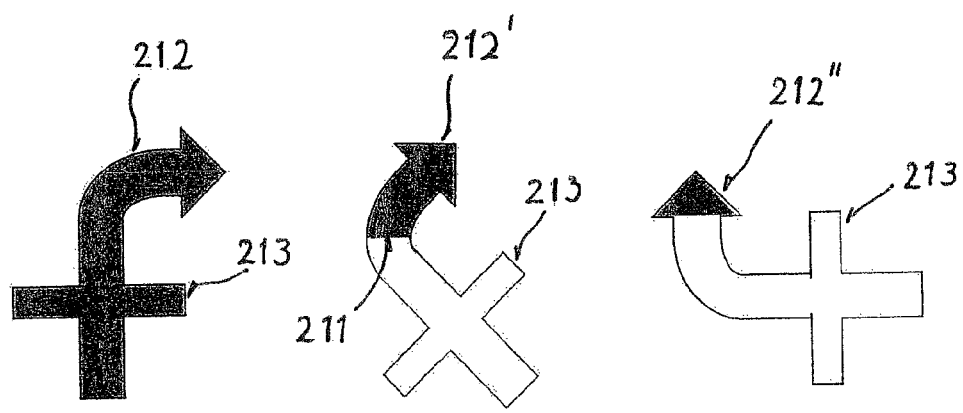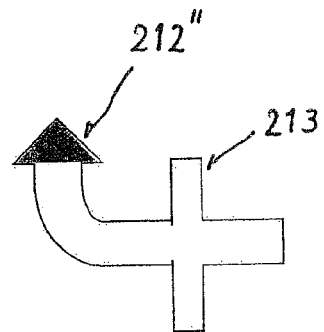
FIG. 4a  FIG. 4b  FIG. 4c

NAVIGATION SYSTEM AND METHOD FOR NAVIGATION

1. CLAIM OF PRIORITY

This patent application claims priority from EP Application No. 12 005 513.2-1236 filed Jul. 27, 2012, which is hereby incorporated by reference.

2. FIELD OF TECHNOLOGY

The present invention relates to the field of motor vehicle navigation, and in particular to presenting graphic and/or alphanumeric information on left and/or right rear view mirrors for the view operator to view.

3. RELATED ART

U.S. Patent Application Publication 2010/245701 A1 discloses a mirror with a monitor for a vehicle that allows display light to pass through a region of a mirror surface thereof from a back side of the mirror surface to be visually recognized by a driver. The region that transmits the display light is improved to have an adequate reflectance when the monitor provides no display and to transmit an increased amount of display light compared with conventional to increase the viewability of the display when the monitor provides display. U.S. Patent Application Publication 2010/245701 A1 shows a mirror with a monitor for a vehicle that allows linearly polarized display light emitted from a light emitting display device to pass through a region of the mirror surface from a back side of the mirror surface thereof to be visually recognized by a viewer. The region of the mirror surface through which the display light passes is formed of a reflective polarizing film having a polarization direction that agrees with the polarization direction of the display light, and a region of the mirror surface adjacent to the reflective polarizing film is formed of a reflective film formed of a reflective metal film or a dielectric multilayer film. Since the region of the mirror surface that transmits the display light is formed of a reflective polarizing film having a polarization direction that agrees with the polarization direction of the display light, the amount of display light transmitted increases and the viewability of the display is improved. The reflective metal film can be a Cr, Ni, Al, Fe, Ag, or Pd film.

EP 2 068 121 B1 shows a navigation system including route guidance function and method of providing route guidance to a user. The screen outputs may be displayed on a display screen of a navigation device which is capable of providing so-called split screen function. On the left hand side of screen output, is shown a part of a map indicating various roads and a highlighted route calculated by a route processing unit of the navigation system. The route processing unit has determined a maneuver point at which the user is required to make a maneuver from the road on which the user is travelling in a first direction to a movement in another almost perpendicular direction, for example, when changing the road. On the right hand side of the screen output, information regarding the route is shown in the form of an arrow which indicates a right turn in e.g., 500 m at the maneuver point. As the vehicle indicated by a vehicle position indicator approaches the maneuver point, the information regarding the route changes to an arrow indicating a destination to the maneuver point of e.g., 300 m.

U.S. Patent Application Publication 2007/0162229 A1 shows a navigation system for a vehicle with an information display at an interior rearview mirror assembly. The information display displays information for viewing by a driver of the vehicle. The information display is located behind the reflective element of the rearview mirror and is viewable through the reflective element by the driver of the vehicle.

JP 2010089705 A shows a rearview mirror with car navigation and camera image. DE 10 2010 007 766 A1 shows a mirror with a monitor for a vehicle. The mirror with the monitor makes it possible for linearly polarized display light, emitted from a light emitting display device, to pass through an area of the mirror surface from a back of the mirror surface thereof to be visually recognized by a viewer. The area of the mirror surface through which the display light passes is formed of a reflective polarizing film having a polarization direction that agrees with the polarization direction of the display light. An area of the mirror surface adjacent to the reflective polarizing film is formed of a reflective film. The reflective film is formed of a reflective metal film or a dielectric multilayer film.

SUMMARY OF THE INVENTION

According to an aspect of the invention, a navigation system of a motor vehicle includes a first display and a second display. The first display may be arranged behind a first mirror surface of a right outside mirror of the vehicle. The second display may be arranged behind a second mirror surface of a left outside mirror of the vehicle. Viewing in the forward driving direction the left outside mirror is on the left hand side of the driver and right outside mirror is on the right hand side of the driver. The first display and/or the second display may be formed for a one color or, in some embodiments, for a multi-color image. The first display and/or the second display and the left outside mirror and/or the right outside mirror may be formed in such a way that display light of the respective display passes through the mirror surface.

The navigation system may have a control unit that controls an output of graphic information on the first display and the second display. The control unit may be connected to the first display and the second display. As an alternative to a wireless connection, the connection to the first display and/or second display may be hard-wired. The control unit may have an electronic circuit with an arithmetic unit for running a program sequence.

The control unit may be configured to determine a current maneuver instruction, based on a route and a current position of the vehicle. The route may be calculated from a start to a destination with a number of maneuvers and associated maneuver instructions. The control unit may have a receiver (e.g., GPS) for determining the current position of the vehicle.

The control unit may be configured to control the output of different graphic information on the first display and the second display, based on the current maneuver instruction and/or the current position.

According to another aspect of the invention, graphic information is output on a first display of a vehicle navigation system, which may be arranged behind a mirror surface of a right outside mirror of the vehicle, and output on a second display, which may be arranged behind a mirror surface of a left outside mirror of the vehicle, and may be controlled by a control unit.

A current maneuver instruction may be determined by the control unit, based on a route and a current position of the vehicle. The output of different graphic information on the first display and the second display may be controlled by the control unit, based on the current maneuver instruction and/or the current position.

The refinements described hereinafter relate to the navigation system and to the method for navigation. In this regard, the functions of the navigation system emerge from the associated process steps. Likewise, the process steps may be derived from the functions of the navigation system.

According to one embodiment, the graphic information may differ at least in regard to the graphic presentation of map data on the first display and the second display. For example, an arrow for turning right is shown exclusively on the first display, whereas an arrow for turning left is shown exclusively on the second display.

In another embodiment, the control unit may be configured to control the visual display of graphic information on the first display. The displayed graphic information may be map data being associated with the right side of the vehicle. For example, road junctions and/or street names and/or traffic rules, which are on the right side of the vehicle, are shown on the first display.

In another embodiment, the control unit may be configured to control the visual display of graphic information on the second display. The displayed graphic information may be map data being associated with the left side of the vehicle. For example, road junctions and/or street names and/or traffic rules, which are on the left side of the vehicle, are shown on the second display.

According to another embodiment, the control unit may be configured to control a first change in the graphic information on the first display and a second change in the graphic information on the second display, depending on a change in the current position in particular at the time of approaching a maneuver point of the current maneuver instruction. In particular the first dynamical change and the second dynamical change may be different.

The control unit may have an interface configured to connect to the first display and the second display. Possible connections may be a wireless connection or direct cabling or a bus, such as for example a CAN or MOST or optical fiber (OF).

In one embodiment, the control unit may be configured to control separately the first display by a first control routine and the second display by a second control routine. The first control routine and the second control routine may be components of a program sequence in an arithmetic unit of the control device.

The control unit may be configured to change, particularly to activate and to deactivate, the output of graphic information on the first display and/or the output of graphic information on the second display. The control unit may be configured to perform the change based on input from a user, for example, the driver, by an input unit. Part of the graphic information may be turned on and off separately by the user input, such as, for example, the text or warning symbols, etc. The navigation system may have an input unit, such as, for example, buttons or a touchscreen, or the like.

In one embodiment, the control unit may be configured to control a change of a distance symbol as graphic information to display the distance on the first display and/or on the second display, based on a distance to a maneuver point of the current maneuver instruction. In addition, it is possible to provide the distance as a numerical value, for example, in meters on the first display and/or the second display.

According to one embodiment, the control unit may be configured to output different graphic information, to control the output of a first symbol on the first display and the output of no symbol or a second symbol on the second display, when the maneuver instruction is associated with a right turn. In this case, the first symbol and the second symbol are different, for example.

According to one embodiment, the control unit may be configured to output different graphic information, to control the output of a third symbol on the second display and the output of no symbol or a fourth symbol on the first display, when the maneuver instruction is associated with a left turn. In this case, the third symbol and the fourth symbol are different, for example.

The control unit may be set up to control the output of symbols as graphic information, in which case the maneuver instruction of the route may be associated with a symbol. Alternatively or in combination, the control unit may be configured to control the output of text, such as maneuver instructions or street names on the first display and/or the second display. The control unit may be configured to control separately the output of symbols and/or text on the first display and the second display. As a result, separate information outputs may occur for the left side and the right side.

The navigation system may have a third display, which may be arranged in the interior of the vehicle. The control unit may be connected to the third display in the interior of the vehicle. The control unit may be configured to control the output of different graphic information on the first display, the second display, and the third display, based on the current maneuver instruction. In particular, a map display may occur on the third display and optionally, in addition, a turn-by-turn instruction by associated symbols. In this case, the output of information in the first display and in the second display may be reduced compared with the output of information in the third display. For example the third display or an additional fourth display is integrated into an interior rear view mirror additionally displaying a distance to an object outside the vehicle, the distance being measured for example by a distance sensor.

The control unit may be configured to control a brightness of the graphic information on the first display and/or on the second display. To adjust the brightness, for example, the power is controlled or the color values are changed. The brightness may be controlled for example by a light sensor sensing the light intensity inside and/or outside the vehicle. Also it is possible to control the brightness on the first and second display differently, e.g., based on the current maneuver instruction.

The previously described refinement variants are especially advantageous both individually and in combination. In this regard, all refinement variants can be combined with one another. Some possible combinations are explained in the description of the exemplary embodiments shown in the figures. These possible combinations of the refinement variants, depicted therein, are not definitive, however.

These and other objects, features and advantages of the present invention will become apparent in light of the detailed description of the embodiments thereof, as illustrated in the accompanying drawings. In the figures, like reference numerals designate corresponding parts.

DESCRIPTION OF THE DRAWINGS

On or more embodiments will be described in greater detail using graphic illustrations.

FIGS. 3a, 3b, 3c show schematically a symbol displayed by a LED display for a semi-transparent mirror surface; and FIGS. 4a, 4b, 4c show schematically a rotation of a symbol displayed by a display for a semi-transparent mirror surface.

DETAILED DESCRIPTION OF THE INVENTION

Figure 1A:
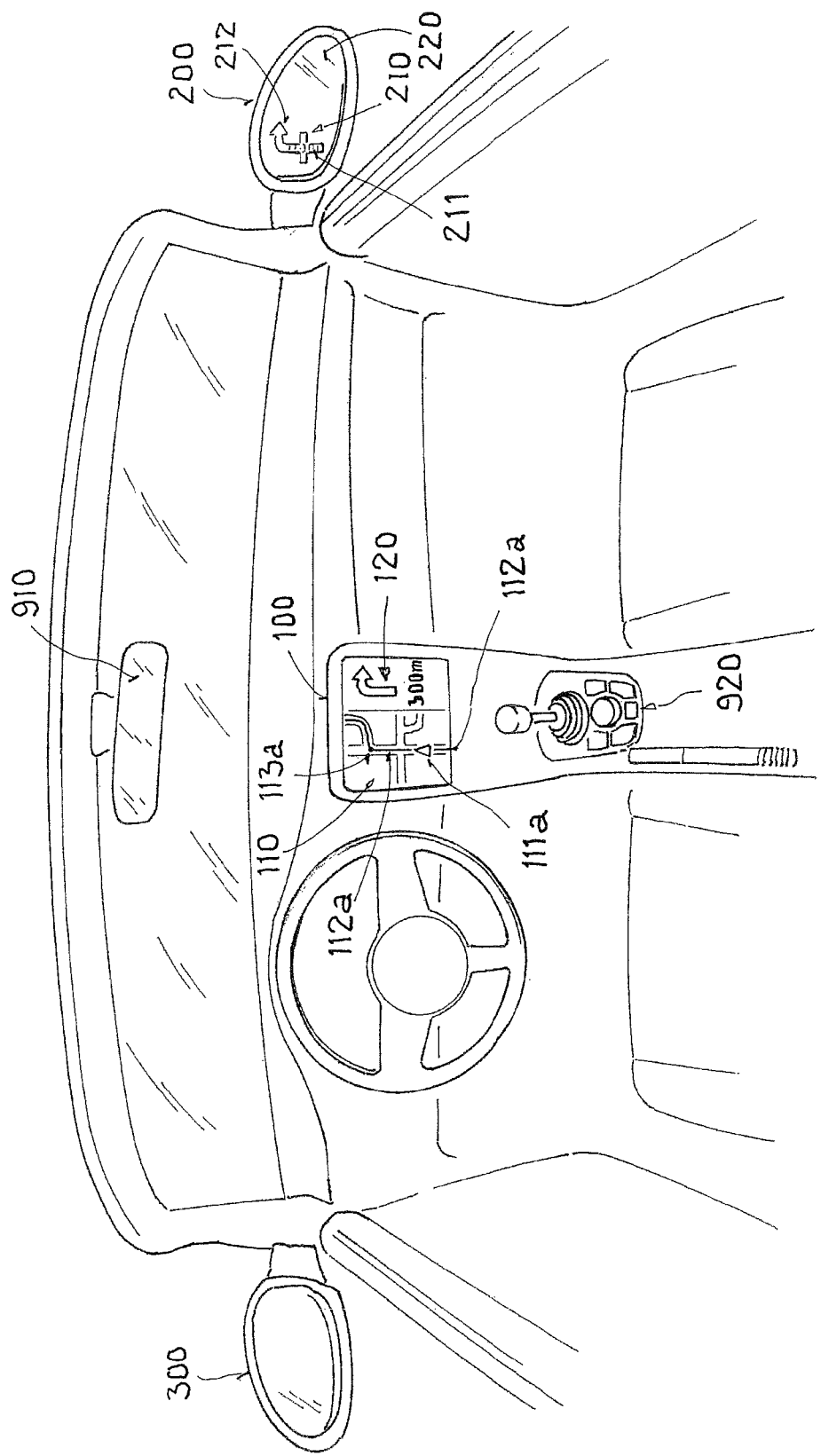
FIGS. 1a and 1b show a schematic interior view of a motor vehicle with a navigation system.
Figure 1B:
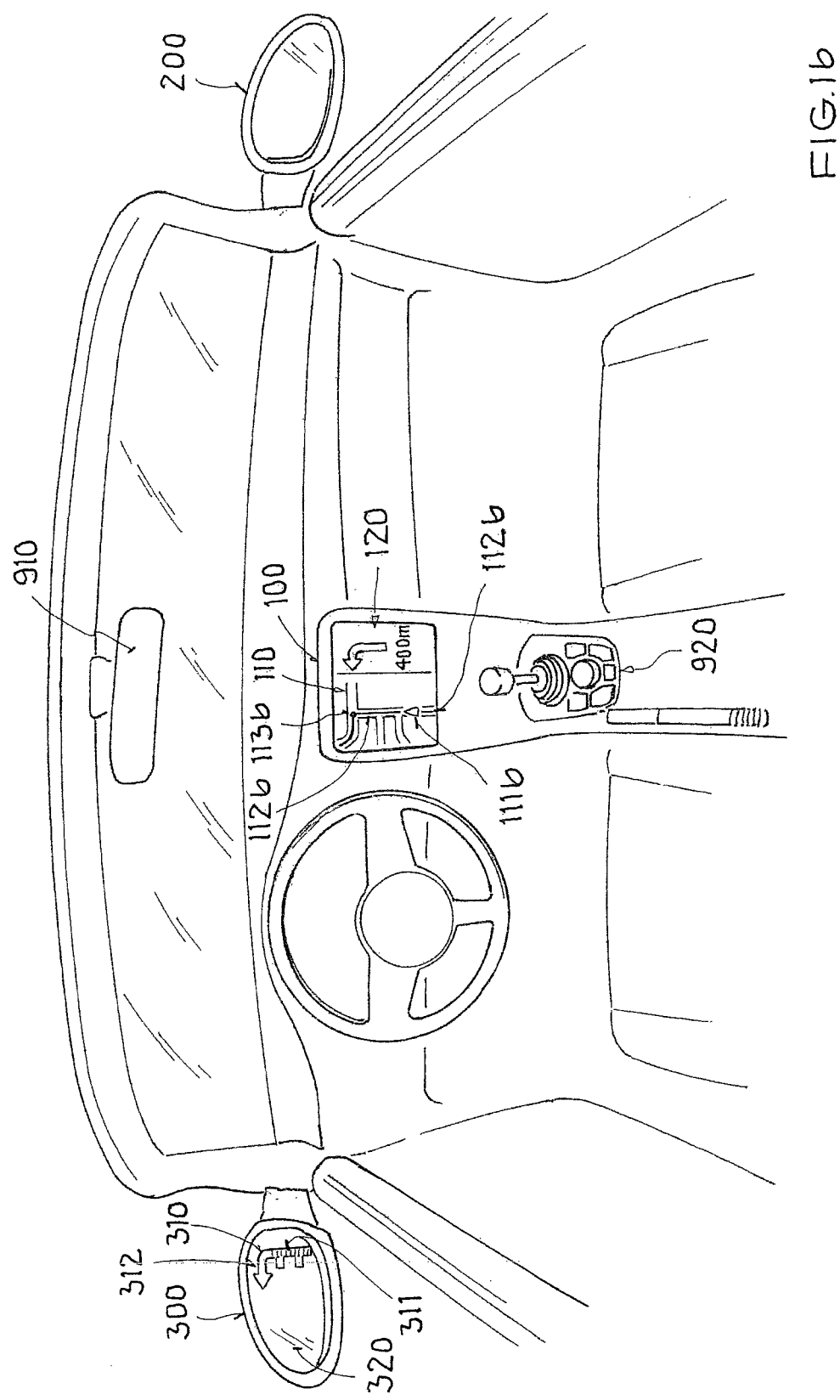

Schematic interior views of a motor vehicle are shown in FIGS. 1a and 1b. The vehicle may have an interior mirror 910 and a right outside mirror 200 and a left outside mirror 300. In this regard, the vehicle sides right and left are defined in the driving direction. The right outside mirror 200 may be used by the driver to observe the rear traffic on the right side of the vehicle. In contrast, the left outside mirror 300 may be used by the driver to observe the rear traffic on the left side of the vehicle, regardless of whether the vehicle is a left hand drive or right hand drive vehicle.

Figure 2:
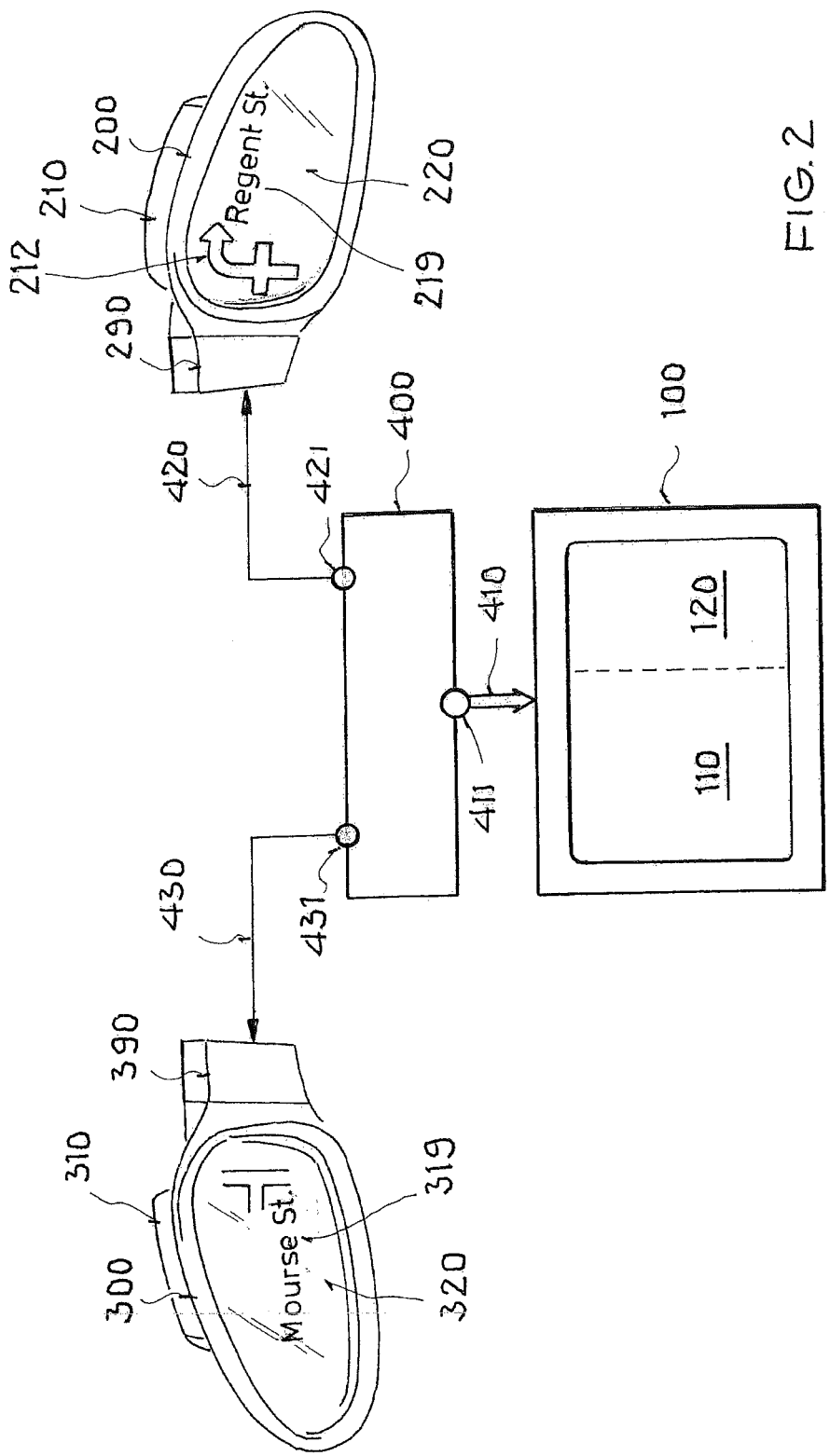
FIG. 2 shows a schematic view of a navigation system.

The navigation system shown in the exemplary embodiment of FIGS. 1a and 1b has a first display 210, which may be arranged behind a first mirror surface 220 of the right outside mirror 200 of the vehicle. In this case, the display light of display 210 may pass through the mirror surface 220, the display light in FIG. 1a being shown as symbol 212. Here, the display 210 may be visible to the driver only because of the display light, as shown in FIGS. 1a and 1b. FIG. 2 shows that the display 210 may be arranged at the back, for example, on a transparent support material of the mirror.

Moreover, referring to FIG. 1b, the navigation system may have a second display 310, which may be arranged behind a second mirror surface 320 of the left outside mirror 300 of the vehicle. For example, the left side mirror 300 is formed corresponding to the right side mirror 200.

Furthermore, the navigation system may have a third display 100 located centrally in the console of the vehicle. In one embodiment of FIG. 1a, the third display 100 may show a map view 110 with a calculated route 112a and a current position 111a of the motor vehicle. In another area of the third display 100, a maneuver symbol of a turn-by-turn presentation 120 may be shown; here, the maneuver symbol may be associated with a maneuver instruction of an upcoming maneuver point 113a.

An input unit 920 may be arranged in the center console of the vehicle. The input unit 920 may enable the driver to carry out an input, for example, to enter a destination address for calculating a route 112a, 112b into the navigation system. The navigation system may be configured to change the visual display by the first display 210 and/or the second display 310 by an input via the input unit 920. The first display 210 and/or the second display 310 may be activated or deactivated. The activation or deactivation may be controlled by a control unit, e.g., depending on a user input via the input unit 920. Advantageously, a brightness of the first display 210 and/or of the second display 310 may be set by the input via the input unit 920 or automatically by evaluating a light sensor signal (not shown).

The side mirrors 200, 300 are provided with an LCD display or LED display behind a semi-transparent mirror surface. The display 210, 310 may be designed in one color or multicolored, particularly as a dot matrix, which may enable a visual display of any symbols 212, 211, 312, 311 and/or a visual display of text. In this case, the display light of the display 210, 310 may pass through the mirror surface 220, 320. The display 210, 310 may be connected by a bus cable 420, 430 to a control unit 400 of a central navigation device, arranged within the vehicle interior. The connections 420, 430 are shown by way of example in FIG. 2. The route guidance symbols 212, 211, 312, 311 or associated control commands, particularly for turning maneuvers, may be transmitted to the display 210, 310 by the bus cable 420, 430. The symbols 212, 211, 312, 311 may be adjusted dynamically during the turning process. For example, a shape of a direction arrow of the symbol may be changed position-dependent, so that the shape of the arrow is different at the beginning and at the end of the turning process.

If there is a change in direction described by the navigation route, a direction indicator in the form of the route guidance symbol 212, 211; 312, 311 may be shown on the side mirror 200, 300. Typically, the driver uses during a right turn the right outside mirror 200 viewing backward traffic, the right outside mirror 200 having the first display 210. The driver uses during a left turn the left outside mirror 300 viewing backward traffic, the left outside mirror 300 having the second display 310. In this case, during turning or lane change the view of the driver may be focused on the side mirrors 200, 300 rather than on the central display 100 of the navigation system. The driver can also orient himself during the turning process further with use of the display 210, 310 in the outside mirror 200, 300, whether he has in fact selected the correct road junction.

It is shown in FIGS. 1a and 1b how control unit 400 may be configured to control the output of different information on the first display 210 and the second display 310, based on a current maneuver instruction. In FIG. 1a, the map view 110 may show that the driver turns right at the next maneuver point on the route 112a. The current position 111a of the vehicle on the route 112a may be about 300 m away from maneuver point 113a, as is shown in the text in the right half of display 120 of central display 100.

In addition to the display in central display 100, the symbol 212 may be shown, which is associated with the maneuver instruction at the maneuver point 113a, by the first display 210 of the right side mirror 200. In the embodiment of FIG. 1a, an arrow in the turning direction may be shown by the first display 210. In addition, road junctions on the right side which precede the maneuver point 113a may be shown. So the driver must pass the preceding junctions shown in the first display 210 before turning.

In addition, in the exemplary embodiment of FIG. 1a, a distance symbol 211 in the form of a bar graph may be indicated by the first display 210. The distance symbol 211 may be changed dynamically with the change in distance to the maneuver point 113a, so that the driver solely based on the visual display in the first display 210 can see the correct junction/exit. In this case, the visual display in first display 210 may show the symbol 212 at the same time in which the driver should recognize rear traffic in the right outside rearview mirror 200, particularly a cyclist, etc. It is important here that the presentation in the first display 210 is especially simple; the information in the presentation in the first display 210 may be reduced, particularly significantly reduced, compared with the presentation in the central display 100.

In contrast, the left outside rearview mirror is of minor importance in case of a right turn in FIG. 1a. In one embodiment of FIG. 1a, the visual displays in the first display 210 and the second display 310 may be therefore different. In one embodiment of FIG. 1a the second display 310 may show no symbols. Alternatively to the presentation in FIG. 1a, in another embodiment (not shown) a symbol for do-not-turn may be shown in second display 310.

Unlike in FIG. 1a, the case of the left turn is shown schematically in FIG. 1b. In this case, the route 112b at a distance of 400 m at the next maneuver point 113b may specify a left turn; here, the driver proceeding from the current position 111b must first pass two road junctions on the left. In one embodiment of FIG. 1b, a symbol 312 with a dynamic distance indicator 311 may be shown only in second display 310 of the left outside mirror 300 in that the display light of the second display 310 may pass through the mirror surface 320 of the left outside mirror 300.

Additionally to the embodiments of FIGS. 1a and 1b, a visual display of text 219, 319 is shown in FIG. 2. In the first display 210 a street name 219 "Regent St." of the next turn may be indicated, which may be exclusively on the right side. In contrast, on the second display 310 a street name 319 "Monroe St." may indicated, which may exclusively on the left side. It is possible to show only the street name of the next turn. Additional textual information on the first display 210 and the second display 310 may be independently indicated, belonging to the right side or left side respectively.

In addition to the different presentation in the first display 210 and in the second display 310, in individual cases depending on the current maneuver instruction, for example, when driving straight, the same information can be shown in the first display 210 and in the second display 310, for example, in driving straight an arrow straight ahead in the driving direction.

In the case that no route is calculated (not shown in FIGS. 1a and 1b) the control unit 400 may still be configured to determine the current position. The control unit 400 may be configured to output a graphic information differently on the first display 210 and the second display 310 based on the current position only. For example street names of the closest intersections or a current no-passing symbol or a current speed limit may be indicated. If the current position is determined by distance sensors in relation to other objects close to the vehicle the graphic information may contain distance information, e.g., a distance bar or a distance value (deactivated in FIGS. 1a, 1b, 2). If a parking position is determined the graphic information at least temporarily indicated may contain a locked-unlocked status and/or a anti-theft status and/or a switched-on status of a current consumer (e.g., interior light) of the vehicle. The graphic information may be at least temporarily indicated by the display 210, 310 on the driver side (deactivated in FIGS. 1a, 1b, 2).

A navigation system is shown schematically in FIG. 2. The navigation system may have a control unit 400 which may have an electronic circuit with an arithmetic unit for running a program sequence. The control function of indications in the first display 210 and the second display 310 may be implemented as a part of the program sequence.

The navigation system may have first display 210, which may be arranged behind first mirror surface 220 of right outside mirror 200 of a vehicle. The display light of display 210 may pass through mirror surface 220. The first display 210 may have first interface electronic 290, connected via a connection 420, for example, a bus connection, to a first terminal 421 of control unit 400.

The navigation system may have second display 310, which may be arranged behind second mirror surface 320 of left outside mirror 300 of the vehicle. Second display 310 may have second interface electronic 390, connected via a connection 430, for example, a bus connection, to second terminal 431 of control unit 400. First terminal 421 and second terminal 431 can be, for example, terminals for bus connection to display 210, 310 like CAN or MOST or direct cabling for display 210, 310.

The navigation system may have third display 100, which may be arranged in the interior of the vehicle. For example, the third display 100 is arranged in a console of the vehicle. The third display 100 may be connected via a connection 410, for example, a bus connection, to a third terminal 411 of control unit 400. Third terminal 411 may be a terminal for CAN, MOST, OF, or direct cabling for third display 100.

Third display 100 may be designed for the graphic presentation of maps in an area 110 and for the presentation of a turn-by-turn symbol in another area 120.

The control unit 400 may be configured to control an output of graphic information 212, 312 on the first display 210, the second display 310, and the third display 100 by connections 410, 420, 430.

An example of a LED display for a semi-transparent mirror surface is schematically shown in FIGS. 3a through 3c. The display may show an arrow 212 of a turning instruction and a preceding junction 213 schematically. Each filled circle schematically shows a highlighted LED, each empty circle shows a non-luminous LED. In FIG. 3a all LED are highlighting, notifying that the junction 213 has not been passed. In FIG. 3b one LED may be switched off, indication that the vehicle approaches the maneuver point. The LEDs of the junction 213 may still be highlighting, indicating that the junction 213 still has not been passed. In FIG. 3c the LEDs of the junction 213 may be switched off, indicating that the junction 213 has been passed already.

Another example of a display for a semi-transparent mirror surface is schematically shown in FIGS. 4a through 4c. In FIG. 4a the display may show an arrow 212 of a turning instruction and a preceding junction 213 schematically. Approaching the maneuver point in FIG. 4b the symbol 212' may be rotated although the shape of the symbol 212' is unchanged. In FIG. 4c the situation is shown, when the vehicle may just have entered the new road after the maneuver point. The arrow 212" now may point into the direction of the new road of the route after the intersection of the last maneuver point. Optionally to the rotation of the symbol 212, 212', 212" a distance indicator may be used. In FIGS. 4b and 4c the symbol 212', 212" may be filled with two colors, the transition 211 between white and black showing the distance, which is zero in FIG. 4c. The driver can easily recognize the drive direction by viewing the current rotation angle of the symbol. In this way a compass function may be used.

The disclosure of course is not limited to the shown embodiment variants of FIGS. 1a through 4c. For example, it is possible to use different display technologies, the presentation being produced, for example, by a change in the reflection properties of the mirror surface 220, 320 of the outside mirror 200, 300, respectively. It is also possible to present other symbols and text as graphic information in the first display 210 and the second display 310. Additionally symbols concerning traffic rules are displayed in the first display 210 and the second display 310. For example a speed limit symbol and/or a no-passing symbol and/or a ban on turns symbol are displayed.

Although various examples of realizing the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Such modifications to the inventive concept are intended to be covered by the appended claims.

What is claimed is:

1. A navigation system of a vehicle comprising:
a first display arranged behind a first mirror surface of a right outside mirror of the vehicle;
a second display arranged behind a second mirror surface of a left outside mirror of the vehicle; and
a control unit connected to the first display and the second display to control an output of graphic information on the first display and the second display, wherein the control unit is configured to determine a current maneuver instruction, based on a route and a current position of the vehicle, and wherein the control unit is configured to control the output of different graphic information on the first display and the second display, based on the current maneuver instruction and/or the current position.

2. The navigation system according to claim 1, wherein the graphic information differs at least in regard to the graphic presentation of map data on the first display and the second display.

3. The navigation system according to claim 2, wherein the control unit is configured to control the visual display of first graphic information on the first display, the first graphic information on map data being associated with the right side of the vehicle, and the control unit is configured to control the visual display of second graphic information on the second display, the second graphic information on map data being associated with the left side of the vehicle.

4. The navigation system according to claim 3, wherein the control unit is configured to control separately the first display by a first control routine and the second display by a second control routine.

5. The navigation system according claim 1, wherein the control unit is configured to control a first change in the first graphic information on the first display and a second change in the second graphic information on the second display depending on a change in the current position with an approach to a maneuver point of the maneuver instruction.

6. The navigation system according to claim 5, wherein the control unit has an interface, configured to connect to the first display and the second display.

7. The navigation system according to claim 6, wherein the control unit is configured to activate and to deactivate the output of graphic information on the first display and/or the output of graphic information on the second display, based on input from a user.

8. The navigation system according to claim 1, wherein the control unit is configured to control a change of a distance symbol as graphic information to display the distance on the first display and/or on the second display, based on a distance to a maneuver point of the current maneuver instruction.

9. The navigation system according to claim 8, the control unit is configured to output different graphic information, to control the output of a first symbol on the first display and the output of no symbol or a second symbol on the second display, when the maneuver instruction is associated with a right turn, wherein the first symbol and the second symbol are different; and the control unit is configured to output different graphic information, to control the output of a third symbol on the second display and the output of no symbol or a fourth symbol on the first display, when the maneuver instruction is associated with a left turn, wherein the third symbol and the fourth symbol are different.

10. The navigation system according to claim 9, wherein the control unit is configured to control the output of a symbol as graphic information, wherein the symbol is associated with the current maneuver instruction of the route and/or the current position.

11. The navigation system according to claim 10, wherein the control unit is configured to rotate the symbol depending on the current position.

12. The navigation system according to claim 1, wherein the control unit is configured to control the output of text as graphic information, wherein the text is associated with the current maneuver instruction of the route and/or the current position.

13. The navigation system according to claim 12, wherein the control unit is connected to a third display in the interior of the vehicle, and wherein the control unit configured to control the output of different graphic information on the first display, the second display, and the third display, based on the current maneuver instruction.

14. The navigation system according to claim 12, wherein the control unit is configured to control a brightness of the graphic information on the first display and/or on the second display.

15. A method for the navigation of a vehicle comprising the steps of:

controlling an output of first graphic information on a first display arranged behind a mirror surface of a right outside mirror of the vehicle, and to a second display arranged behind a mirror surface of a left outside mirror of the vehicle;

determining a current maneuver instruction based on a route and a current position of the vehicle by means of the control unit; and controlling the output of different graphic information on the first display and the second display, based on the current maneuver instruction and/or the current position.

* * * * *